March 6, 1956  D. B. BRUMMEL  2,737,227
MOLDABLE LAMINATE MATERIAL AND METHOD
AND APPARATUS FOR MAKING SAME
Filed May 20, 1952  5 Sheets-Sheet 1
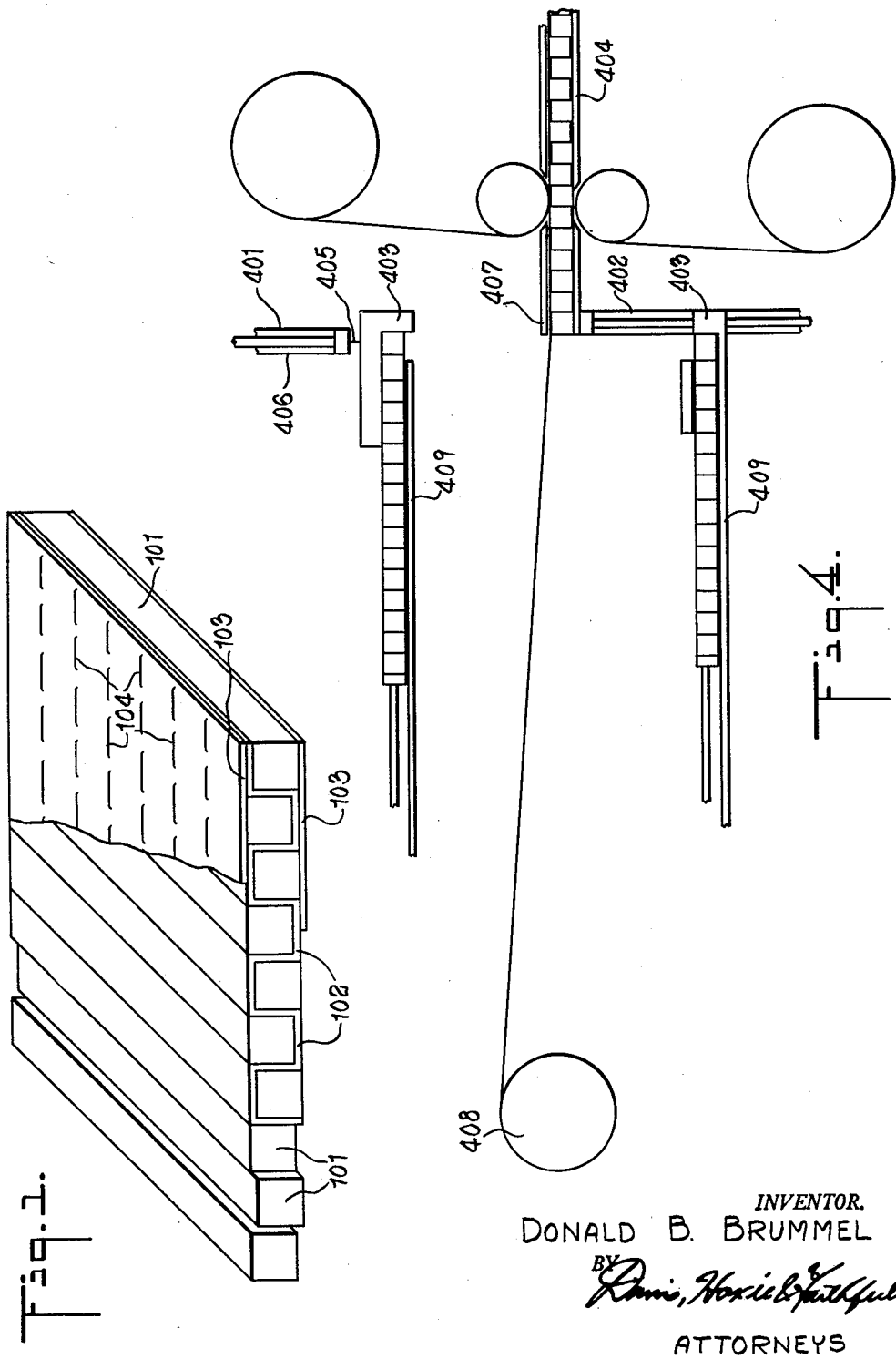
INVENTOR.
DONALD B. BRUMMEL
BY
ATTORNEYS March 6, 1956  
D. B. BRUMMEL  
2,737,227  
MOLDABLE LAMINATE MATERIAL AND METHOD  
AND APPARATUS FOR MAKING SAME  
Filed May 20, 1952  
5 Sheets-Sheet 2
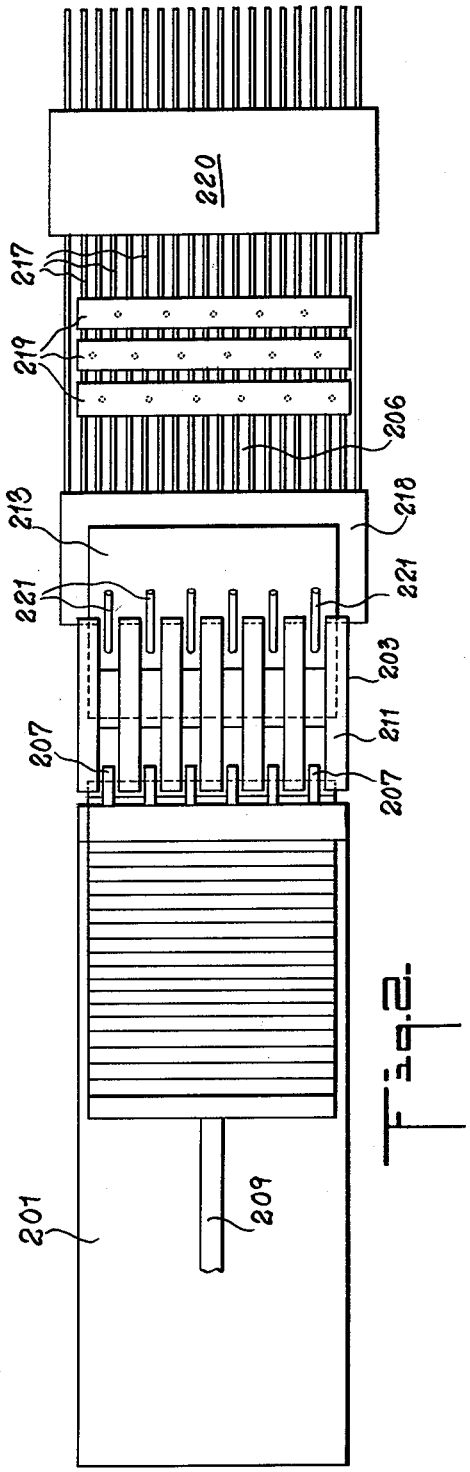
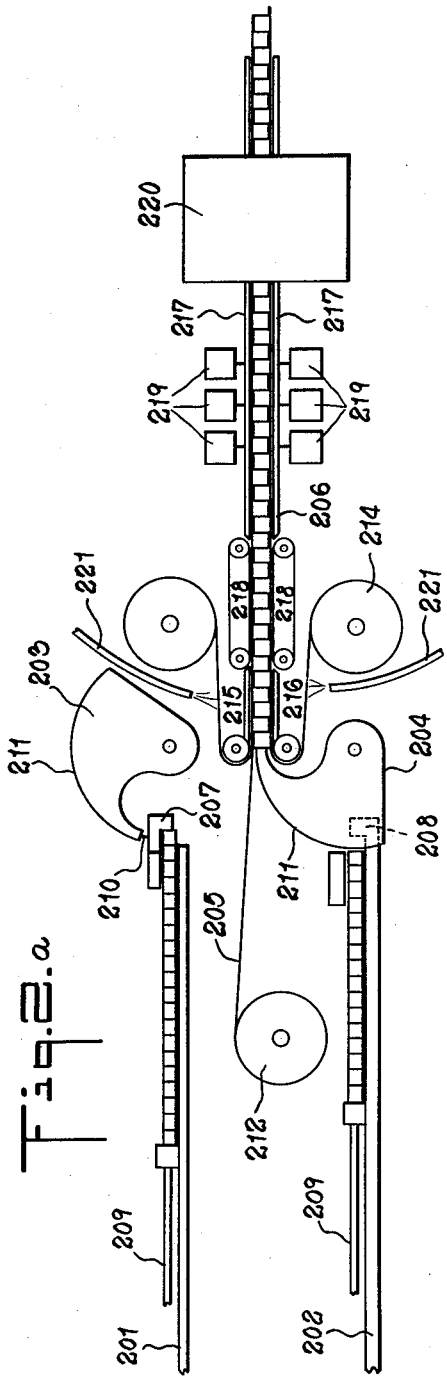
INVENTOR.  
DONALD B. BRUMMEL  
BY  
ATTORNEYS March 6, 1956
D. B. BRUMMEL
2,737,227
MOLDABLE LAMINATE MATERIAL AND METHOD
AND APPARATUS FOR MAKING SAME
Filed May 20, 1952
5 Sheets—Sheet 3
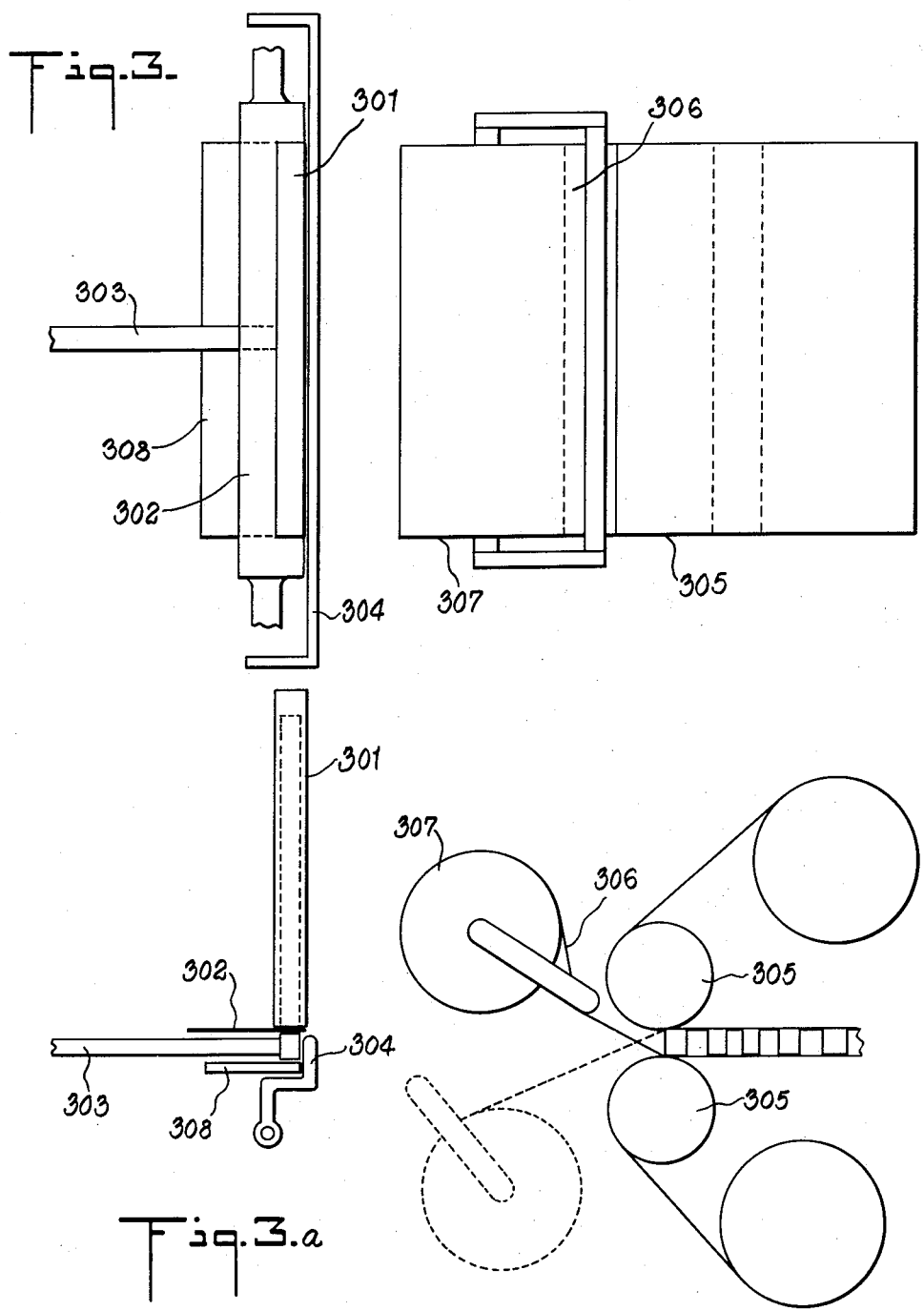
INVENTOR.
DONALD B. BRUMMEL
BY
ATTORNEYS

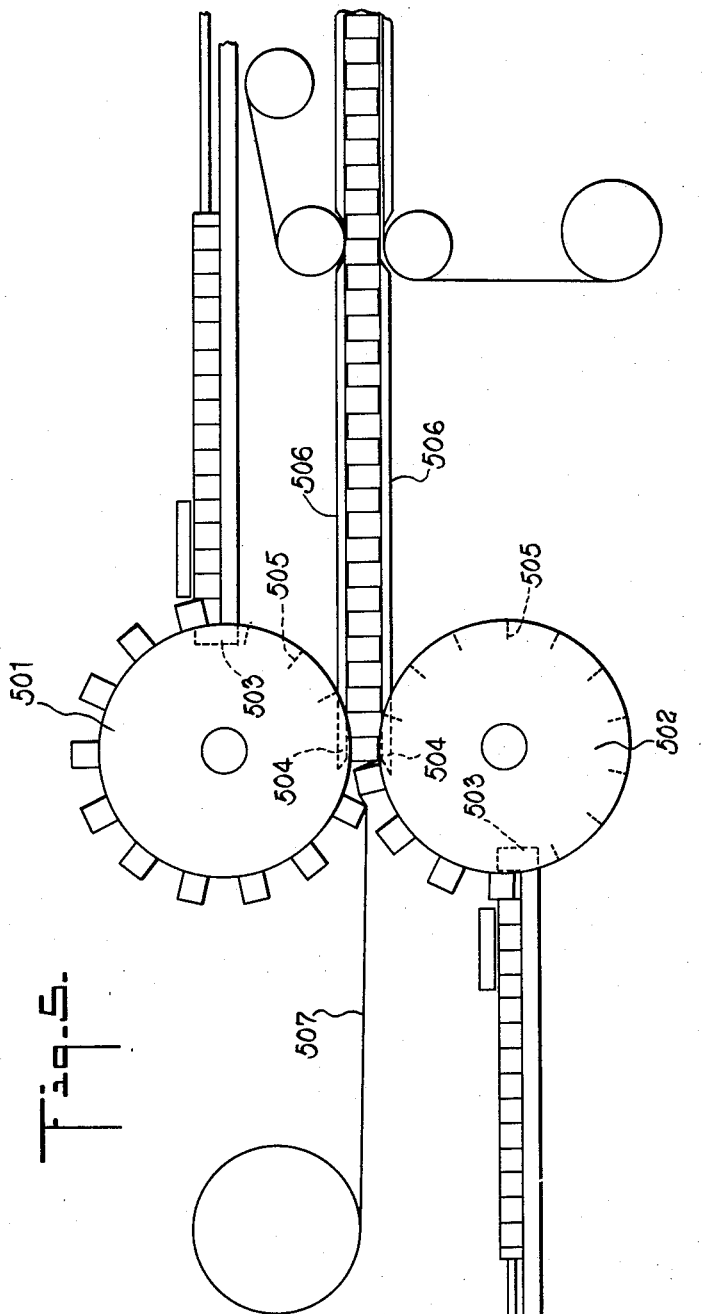

March 6, 1956     D. B. BRUMMEL     2,737,227
MOLDABLE LAMINATE MATERIAL AND METHOD
AND APPARATUS FOR MAKING SAME
Filed May 20, 1952     5 Sheets-Sheet 5
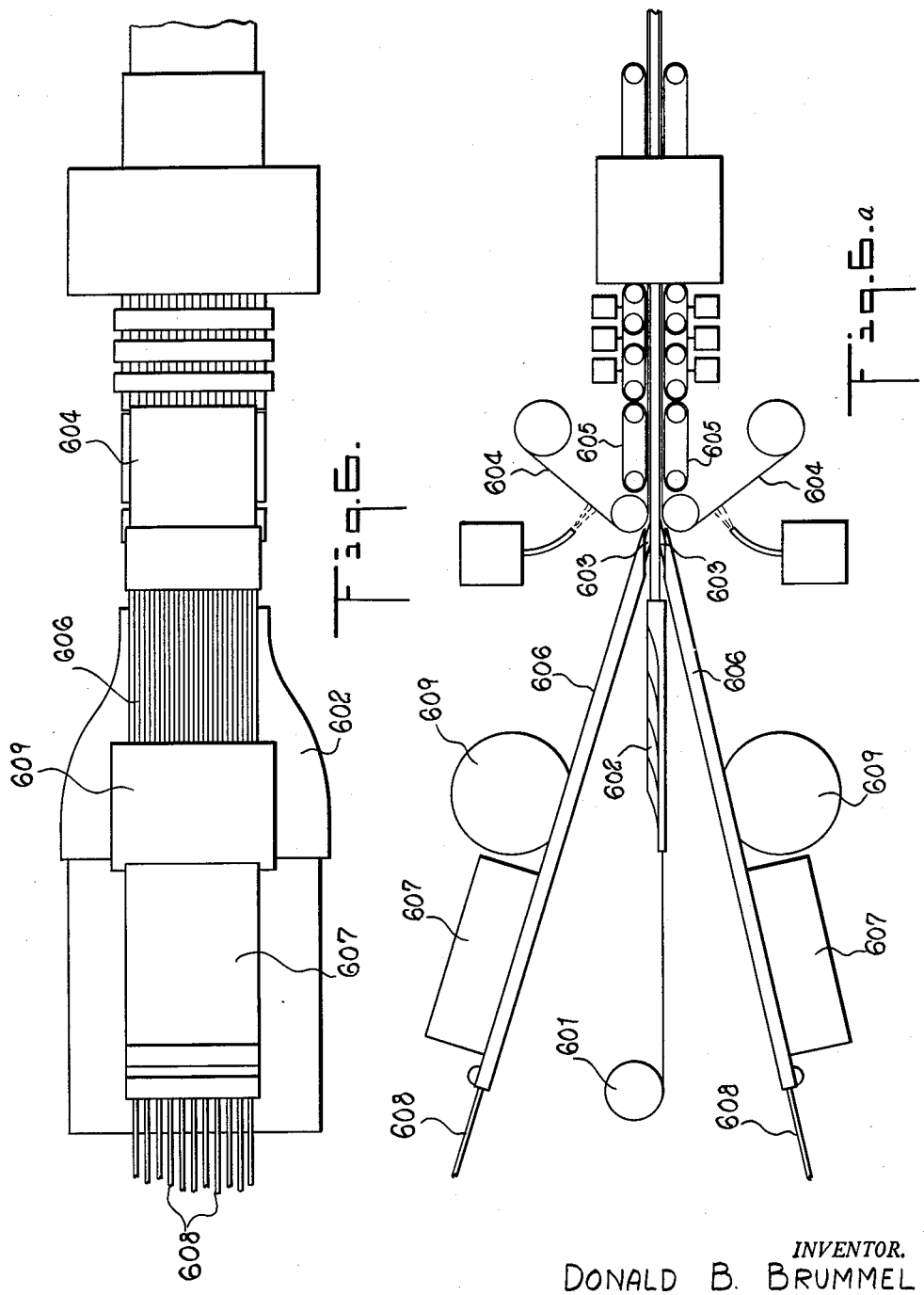
INVENTOR.
DONALD B. BRUMMEL
BY
ATTORNEYS United States Patent Office 2,737,227
Patented Mar. 6, 1956

2,737,227

MOLDABLE LAMINATE MATERIAL AND METHOD AND APPARATUS FOR MAKING SAME

Donald B. Brummel, Glen Cove, N. Y.

Application May 20, 1952, Serial No. 288,941

4 Claims. (Cl. 154—31)

This invention relates to reinforced light strong cellular panels and the like and to the method of and machine for making the same.

The panel or other structure of this invention is fabricated generally of external faces and internal corrugation sheet and core strips which are stitched or bonded together. The faces and corrugation sheet are of cloth, paper, mat or felt and made from organic or inorganic fibers; while the core strips are wood, expanded plastics, sponge rubber, or other light weight material.

Heretofore in the design of certain cellular laminates or sheet materials seeking a high strength-weight ratio various disadvantages have been encountered. One general type of cellular structure has cells parallel to the enclosing surface faces formed by inserts or mandrels which are later to be withdrawn. Adhesion of the plastic in the structure to the inserts or mandrels makes their withdrawal difficult if not impossible, particularly when pressure is employed during the curing or forming phase of the manufacturing cycle. Attempts to overcome such adhesion by tapering the mandrels or inserts results in a structure which is unfeasible except in narrow structures; and the factor of mandrel insertion and withdrawal requires that the structure be flat and completely cured at the time of manufacture.

Another general type of laminate structure known in the art as a sandwich laminate has surface faces of high strength enclosing a solid core of low weight low strength material. Under any stress which subjects such structure to sheer strain in the plane of the core material such low strength core becomes the critical determinant.

In still other types known in the art as honeycomb laminates strength is dependent upon the adhesion of thin sheets of material perpendicular to the enclosing surface faces. Such laminates, when properly made, are strong and light in weight. However, any deviation from the proper manufacturing process may or does result in delamination and consequent structural failure.

These disadvantages or limitations, and others, have been overcome in the panel structure of this invention which combines strength and lightness to a high degree, may be molded in flat panels or readily fabricated to intricate moldable shapes, and which also incorporates desired properties of buoyancy and heat and sound insulation.

With the disadvantages and limitations of prior structures in view, this invention consists of the arrangement, construction and combination of various parts of the improved method and articles as described in the specification, claimed in the claims and illustrated in the accompanying drawings in which:

Fig. 1 is a perspective cutaway view of the panel structure which is moldable.

Figs. 2 and 2a are diagrammatical illustrations of a method by which the structure may be assembled.

Figs. 3 and 3a, 4, 5, and 6 and 6a illustrate variations of the method by which the structure may be assembled.

Referring now to Fig. 1, which illustrates a typical laminate manufactured by the process hereinafter described, the laminate comprises core strips 101 of generally any light weight material such as expanded plastics, foamed or sponge rubber, balsa wood, calcium silicate, etc., a corrugation sheet 102 of one or more plies of Fiberglas cloth or mat or other cloth, paper, etc., surface faces 103 each composed of one or more plies of material of the class suitable for corrugation sheet, and stitching 104 of thread or the like sufficiently strong to hold the structure together for subsequent handling and molding. The thread used for stitching may be impregnated with a resin which will harden and so prevent the stitching from unravelling when the laminate is cut to pattern prior to molding. The stitching may be supplemented or replaced by light bonding as hereinafter described, when such treatment better serves the end use of the laminate. The laminate may be made conveniently in any length and in width generally subject to the width of corrugation and surface materials available, which at present is about six feet.

The laminate of this invention is a structure designed for further processing by branches of the laminating industry; it is in a dry state as made by the methods hereinafter described. It must be impregnated with resin, and the resin cured, before attaining structural strength. If the end use is to be a flat panel, the required type and amount of surface face and corrugation sheet material can be initially incorporated in the original manufacture by the methods hereinafter described. However, the laminator may add additional plies of surface face material during his process of resin impregnation and cure. The laminate possesses the advantage of being formable to shape prior to impregnation and cure of the resin. For instance, if the laminate were to be used in the manufacture of a boat hull, it would be designed and manufactured with a heavy corrugation sheet, light surface faces generally sufficient only to hold the structure firmly together, and core strips of light buoyant material such as cellular cellulose acetate. The boat laminator would cut the laminate to suitable patterns, goring it to permit it to assume the compound curvatures required, and heat-form the laminate to cause it to conform approximately to its finished shape. He would then lay one or more plies of Fiberglas cloth or mat in his boat hull mold, place the preformed laminate, and finish his layup by adding one or more plies of Fiberglas cloth or mat on the inside surface of the laminate. Subsequent to or during his layup operation he would impregnate the cloth and mat and laminate with resin. He would then cure the resin; and after the cure would have a boat hull ready for trimming and use. It will be seen that in such typical use the laminate of this invention, complete with its core strips, corrugation sheet and surface faces, is actually used by a laminator as a core material for his further operations, the laminate serving to provide him with a ready-made structural material which adds to his product the desired properties of high strength-to-weight ratio and inherent buoyancy.

The laminate derives its high strength-to-weight ratio by the multitude of webs formed by the corrugation sheet as it passes from one surface face to the other. When impregnated with resin and cured the webs and the surface faces become hard and practically inseparable because of the large area of bonding surface between the corrugation sheet and surface faces formed as the corrugation sheet passes alternately above and below succeeding core strips and intimately adjacent to the respective surface faces. The resultant product is composed of a series of parallel contiguous box beams formed by the webs and surface faces. These box beams, in addition to their inherent strength, are further strengthened by the action of the core strips to which they are closely bonded during the curing cycle in that the core strips serve to strengthen all four sides of each box beam from buckling and consequent failure.

The structure may be manufactured by hand and by machines such as are illustrated diagrammatically in Figs. 2, and 2a, 3 and 3a, 4, 5 and 6. In the machine of Figs. 2 and 2a, the core strips which have been cut to the desired shape and dimension from sheets or boards of expanded plastic or other material are fed alternately from upper and lower core racks 201 and 202, by upper and lower driver arms 203 and 204, to opposite sides, respectively, of the corrugation sheet 205, thereby corrugating said material alternately under and over successive core strips as they are forced by the driver arms into the end of the laminate frame 206. The core strips are pressed snugly against stops 207 and 208 at the forward end of the core racks by any desired means, such as plungers 209 which may be actuated by weights acting through pulleys, air or hydraulic pistons, by a battery of endless friction belts driven through fluid drives or friction slip clutches, or by gravity alone if the entire machine is designed to operate with core racks in a vertical rather than in the horizontal position illustrated. Pins or clips 210 on the contact faces of the driver arms hold the core strips as they are being swung into position in the laminate frame; and preventer faces 211 on the roller arms prevent the core strips from being moved against the stops 207 and 208 while the driver arms are swinging a core strip into the laminate frame.

As each core strip is driven into the laminate frame it pushes the laminate forward through the frame and at the same time presses the corrugation sheet against the adjacent surface of the preceding core strip and along the upper or lower side, as the case may be, of the core strip. In so doing, the core strips draw the necessary amount of corrugation sheet from friction-retarded roll 212 and of upper and lower surface face material from friction-retarded rolls 213 and 214 and over alignment rollers 215 and 216.

The laminate frame consists essentially of an upper and a lower surface between which the laminate is forced or impelled. The laminate frame surfaces may consist of rods, bars or plates 217 adjustable relative each other so that sufficient pressure may be exerted on the laminate to offer frictional resistance to its movement; or the laminate frame surfaces may be friction-retarded endless belts 218 separated by the thickness of the laminate. As a driver arm forces a core strip into the laminate frame it must exert considerable pressure against the preceding core strip and overcome the tension of the corrugation sheet and surface faces. The result is a laminate with smooth surface faces and a tight smooth inner structure.

The laminate is bound together before leaving the machine by one or both of two methods. Stitching machines 219 provide parallel rows of lock stitching extending completely through the laminate. To provide a means of preventing unravelling of the thread in addition to the lock stitch when the laminate is cut to pattern, the thread may be impregnated with a resin prior, during, or subsequent to stitching. As the laminate is driven through, the oven 220 heat cures and hardens the resin, and the thread cannot thereafter be unravelled except by the use of force. The second binding of the laminate is accomplished by spraying the inner faces of the surface faces with one of several bonding agents known in the art such as dilute laminating varnishes, starch binder, or other depending upon the end use to which the laminate will be consigned. Spraying is accomplished by spray nozzles 221 which lightly impregnate the material. As the laminate passes through oven 220 the binder is dried or cured.

Referring now to Figs. 3 and 3a, a machine is illustrated diagrammatically in which the elements of surface supply, laminate frame, stitching, bonding and oven are identical to those of the machine illustrated in Figs. 2 and 2a. The single core rack 301 contains sheets or boards of core material, a convenient size of such material being four feet by six feet. A saw or knife 302 cuts a core strip from the board and restrains the board from dropping down until desired. A reciprocating drive bar 303 moves toward the core strip and grasps it with pins or clips as it forces the core strip against restraining lug bar 304. The lug bar is released and swung downward when the drive bar has fully grasped the core strip, and the drive bar moves the core strip into the laminate frame between surface face alignment rollers 305. As the core strip is moved toward the laminate frame it meets and shapes the corrugation sheet 306 along the adjacent side of the preceding core strip and above or below the core strip as the case may be, thus corrugating the corrugation sheet. The corrugation sheet is placed alternately above and below the plane of the drive bar by the alternate movement of friction-retarded roll 307 up and down. As the drive bar is withdrawn after placing a core strip the lug bar returns to its spring-loaded position and the saw or knife blade is withdrawn thus allowing the core board to be forced down onto table 308 preparatory to another cut.

Referring now to Fig. 4 a machine is diagrammatically illustrated in which the surface face supply, laminate frame, stitching, bonding, oven, and core rack assembly are similar to those of the machine illustrated in Figs. 2 and 2a. Drive combs 401 and 402 consist of parallel bars which are set at intervals to fit between the teeth of the core stops 403. The cycle of operation begins with a drive comb in the relative position of the upper comb 401: that is, on the side of its respective core rack opposite from the laminate frame 404. As a drive comb is moved vertically toward the laminate frame it grasps a core strip by means of pins or clips 405 and moves the core strip to a position opposite the opening of the laminate frame. In so doing, the retaining face 406 of the drive comb prevents the core strips remaining in the core rack from moving toward the stops. When the core strip is brought opposite the opening in the laminate frame the entire drive comb is moved horizontally toward the laminate frame. This horizontal movement drives the core strip between the spaced rods 407 of the laminate frame, draws the necessary amount of corrugation sheet from roll 408 and presses it tightly against the preceding core strip, drives the entire laminate through the frame in the manner shown in Fig. 2, and permits the unused core strips in the rack 409 to advance against the stops. After the horizontal movement the drive comb is withdrawn vertically for its full length of travel and then returned horizontally to its initial position. In this fashion the drive combs alternately place their respective core strips in the laminate frame.

Referring now to Fig. 5 a machine is diagrammatically illustrated in which the laminate frame, core rack assemblies, corrugation sheet and surface face supply, stitching, bonding and oven are similar to those of Figs. 2 and 2a. Sets of parallel wheels 501 and 502, spaced at intervals to fit between the core stops 503 and laminate frame bars 504, are fitted with pins 505. The pins are actuated by means such as cams, solenoids, or air or hydraulic means to recede within or extend beyond the periphery of the wheels. The upper set of wheels is set at such rotary respect to the lower set of wheels as to position the pins of one set intermediate those of the other set. As the wheels rotate, one plane or row of pins which are wholly withdrawn into the wheels is forced rapidly outward as the pins arrive at a position opposite a core strip in the core racks. This movement impales the core strip on a set of pins which thereafter carry the core strip around on the wheels. As the core strip approaches the end of the laminate frame 506 it begins to corrugate the corrugation sheet 507 against the preceding core strip of the opposite set of wheels. As it is farther carried, the core strip is placed between the bars 504 of the laminate frame at which time the pins are rapidly withdrawn into the wheels and additional movement of the core strip through the frame is caused by the placing of succeeding core strips in the laminate frame.

Referring now to Figs. 6 and 6a, a machine is diagrammatically illustrated in which the core strips are placed parallel to the direction of movement of the laminate through the machine rather than at right angle to such direction as in the machines previously herein illustrated. This machine preforms the corrugation sheet prior to insertion of the core strips and is thus particularly suited to the utilization of soft core material such as foam rubber and the like which does not offer sufficient rigidity to drive the laminate through the frame with perfect form retention.

The corrugation sheet on roll 601 is drawn through matched formed metal plates 602 which, beginning at the center, progressively corrugate the flat material as it is drawn through the plates until it is corrugated for its full width. The core strips 603 are fed from above and below into the channels of the corrugation. Immediately following the introduction of the core strips the surface faces 604 are added. The laminate is next passed between the motor driven endless friction belts 605 of the laminate frame which impel it through the frame for further processing similar to the method illustrated in Fig. 2 as well as provide the motive power for drawing the corrugation sheet, core strips and surface faces from their respective sources.

The core strips are fed into the laminate assembly through channelled core racks 606. If the core strips are of rigid material they are fed onto the core racks from core chutes 607 and impelled forward singly by drive bars 608 until they are meshed in the corrugation sheet and thenceforth moved as an integral part of the laminate assembly. If the core strips are long lengths of material such as foam rubber they are fed from coils in core drums 609.

From the foregoing examples it will be seen that certain changes may be made in the arrangement, construction, and combination of the process and laminate structure disclosed without parting from the spirit of the invention; and it is the intention to cover by the claims such changes as may be reasonably included within the scope thereof.

I claim:

1. A moldable laminate structure comprising pliable upper and lower facings of substantially non-shrinkable, non-elastic but pliable fibrous material, permanently deformable core strips of light weight substantially rigid cellular plastic material positioned in side-by-side relation between and along the facings, and a corrugated layer of substantially non-shrinkable, non-elastic but pliable fibrous material positioned between the facings and alternately over and under the successive core strips, the facings and corrugated layer being loosely but securely fastened together and to each of the core strips.

2. A method of making a moldable laminate structure comprising continuously corrugating a pliable fibrous reinforcing web by means of inserting light weight cellular plastic core strips successively upon alternate surfaces of said web, then laying pliable fibrous facing material upon opposed surfaces of the preceding assembly and loosely but securely fastening together the entire assembly by means applied successively and synchronized with the movement of said assembly whereby each core strip is permanently secured to the web and facing material.

3. In a machine for forming a moldable reinforced panel of cellular structure, racks for supporting core strips, a dispensing device for feeding a reinforcing sheet, a frame for receiving said core strips and reinforcing sheet, dispensing devices for feeding to the upper and lower surfaces of alternate core strips respectively surfacing materials during passage through said frame, driven means for transferring the core strips alternately from their respective racks to the opposite surfaces of said reinforcing sheet and passing the entire assembly on through the frame, and means for fastening said assembly together while passing through said frame.

4. In a machine for forming a moldable laminate material, core strip supporting racks, synchronized transfer means associated with each of said racks for moving the core strips alternately therefrom onto opposite surfaces of a reinforcing sheet, a dispensing device for said sheet, means for corrugating said sheet, a laminate frame for receiving said transferred core strips and corrugated sheet, dispensing devices for feeding surface material to the upper and lower surfaces respectively of said laminate frame, fastening means associated with said frame for holding the assembly of core strips, corrugated sheet and surface material together and means for moving said assembly into and through said laminate frame.

References Cited in the file of this patent

UNITED STATES PATENTS

| | | |
|---|---|---|
| 1,126,157 | Abbott | Jan. 26, 1915 |
| 1,191,765 | Crumbaugh | July 18, 1916 |
| 2,197,132 | Lougheed | Apr. 16, 1940 |
| 2,454,719 | Scogland | Nov. 23, 1948 |
| 2,523,524 | Sachs | Sept. 26, 1950 |
| 2,583,337 | Laing | Jan. 22, 1952 |
| 2,607,104 | Foster | Aug. 19, 1952 |

FOREIGN PATENTS

| | | |
|---|---|---|
| 241,081 | Germany | Nov. 24, 1911 |